United States Patent Office 3,740,411
Patented June 19, 1973

3,740,411
WATER-SOLUBLE ANTIBACTERIAL COMPOUNDS
Hisao Akiyama, Nishinomiya, Shigeru Okano, Ibaraki, and Hiroyuki Suzuki, Kaoru Maezima, Toshiaki Komatsu, and Toyozo Katsura, Takarazuka, Japan, assignors to Sumitomo Chemical Company, Limited, Osaka, Japan
No Drawing. Filed June 18, 1971, Ser. No. 154,662
Claims priority, application Japan, June 23, 1970, 45/55,447
Int. Cl. C07d 31/44
U.S. Cl. 260—295 Q                     1 Claim

ABSTRACT OF THE DISCLOSURE

A novel water-soluble antibacterial compound of the formula

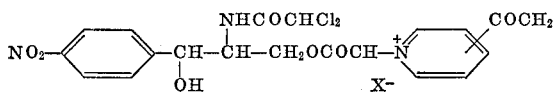

wherein X is a halogen anion.

These compounds are produced by reacting a halogeno-acetic acid ester of chloramphenicol or thiamphenicol represented by the formula:

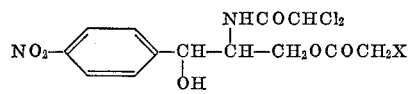

wherein X is as hereinbefore defined, with carbamoyl-pyridine represented by

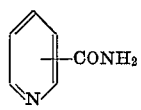

---

The present invention relates to a method for producing a novel water-soluble derivative of chloramphenicol and thiamphenicol. More particularly, it relates to a method for producing a novel derivative of chloramphenicol and thiamphenicol of the General Formula III by reacting halogeno-acetic acid ester of chloramphenicol or thiamphenicol represented by the General Formula I with carbamoylpyridine represented by the General Formula II:

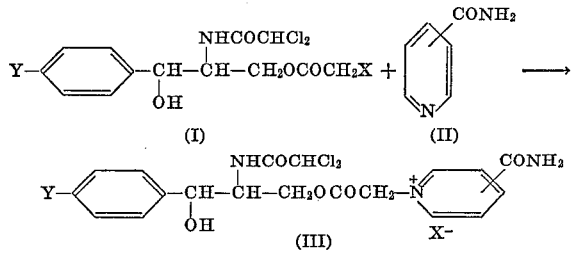

wherein X is a halogen anion, and Y is a nitro (—NO$_2$) or methylsulfonyl radical (—SO$_2$CH$_3$).

Chloramphenicol and thiamphenicol are very useful antibacterial agents but are not readily soluble in water and therefore suffer from the disadvantage that they cannot be administered by injection.

Therefore, research has been carried out to produce water-soluble chloramphenicol and thiamphenicol derivatives. However, at present, chloramphenicol succinate and thiamphenicol glycinate are the only products which have been brought into practical use.

As the result of a study on a water-soluble derivative of chloramphenicol and thiamphenicol, we have found that their carbamoylpyridinium acetic acid esters of the General Formula III are water-soluble and furthermore have a powerful antibacterial activity. These compounds are new compounds which have not hitherto been described in the literature.

This invention provides a method for producing carbamoylpyridinium acetic acid ester in high yield by reacting halogeno-acetic acid ester of chloramphenicol or thiamphenicol with carbamoylpyridine either in the presence or absence of a solvent.

As the reaction solvents, polar solvents such as acetone, chloroform, acetonitrile, dimethylformamide, etc. are used. However, the reaction proceeds satisfactorily by using an excessive amount of carbamoylpyridine instead of using these solvents. The reaction is carried out either at the boiling point of the solvent or at an arbitrary temperature below that point. The reaction time is varied depending on the reaction temperature. However the reaction is completed in 30 hours at a reaction temperature of 55° C.

During the reaction, there occurs some decomposition reaction of the starting material, i.e. the halogenoacetic acid ester of chloramphenicol or thiamphenicol, into chloramphenicol or thiamphenicol. However, in the case of the reaction, for example, in acetone as solvent, the desired product separates out from the solvent while the by-product is dissolved in the solvent, which therefore can be easily removed. Also, when solvent is not used, an excessive amount of carbamoylpyridine and water-soluble impurities including the starting material halogeno-acetic acid ester and chloramphenicol or thiamphenicol can be removed, by adding water and a water-insoluble organic solvent such as ethyl acetate with thorough stirring after the reaction separating the mixture into water-soluble and water-insoluble layers and washing the water layer with an organic solvent.

The desired substance can be obtained by further purifying, for example, with activated carbon and then evaporating to dryness, though the desired substance can be obtained in a more favorable state by using a freeze-drying method. Also, the desired substance can be obtained as needle-like crystals by cooling a concentrated aqueous solution or can be obtained in a pure state by crystallizing from a suitable solvent.

The halogeno-acetic acid esters of chloramphenicol and thiamphenicol can be easily obtained, for example, by reacting chloroacetyl chloride or any other corresponding halogen-substituted acetyl halides with chloramphenicol or thiamphenicol.

The carbamoylpyridinium acetic acid ester (III) obtained by the method of this invention is water soluble and has a powerful antibacterial activity in any case where X represents Cl, Br or I, though examples in which X is Cl are illustrated in the following.

The invention is explained more concretely by the following examples, but it is not intended to limit the invention to these examples.

EXAMPLE 1

Ten grams of chloroacetic acid ester of chloramphenicol and 15.2 g. of nicotinamide were suspended in 200 ml. dry acetone and heated to reflux at 57–58° C. for 30 minutes. The reaction liquid was then added with ethyl acetate and was refluxed at 66° C. for five minutes. The liquid was then filtered while hot. After the residue of the filter was washed with 100 ml. hot acetone, it was recrystallized from 99% alcohol and 2.5 g. of white-light pink crystals was obtained. Melting point: 153–156° C.

Elementary analysis as $C_{19}H_{19}O_7N_4Cl_3$.—Calculated (percent): C, 43.74; H, 3.67; N, 10.74; Cl, 20.39. Observed (percent): C, 43.52; H, 3.70; N, 10.59; Cl. 20.43.

EXAMPLE 2

Nine grams of chloroacetic acid ester of thiamphenicol and 12.7 g. of nicotinamide were suspended in 180 ml. dry acetone and heated to reflux at 57–58° C. for 30 hours. The reaction liquid was added with 200 ml. ethyl acetate and was refluxed at 67° C. for five minutes. The liquid was filtered while hot. After the residue on the filter was washed with 100 ml. hot acetone, it was recrystallized from 80% alcohol and 6.2 g. of white-light yellow crystals was obtained. Melting point: 176–178° C.

Elementary analysis as $C_{20}H_{22}O_7N_3Cl_3S$.—Calculated (percent): C, 43.29; H, 4.00; N, 7.57; Cl, 19.17; S, 5.78. Found (percent): C, 42.90; H, 4.10; N, 7.44; Cl, 19.07; S, 5.73.

What we claim is:
1. A compound represented by the formula

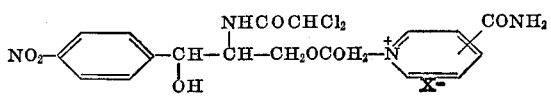

wherein X is a halogen anion.

References Cited

UNITED STATES PATENTS 2,359,864  10/1944  Linch _____ 260—295 Q

ALAN L. ROTMAN, Primary Examiner

U.S. Cl. X.R.

260—294.8 F, 295.5 A; 424—266